US 8,161,302 B2

(12) United States Patent
Woo

(10) Patent No.: US 8,161,302 B2
(45) Date of Patent: Apr. 17, 2012

(54) METHOD AND APPARATUS FOR DATA TRANSMISSION IN WIRELESS LOCAL ACCESS NETWORK AND SYSTEM THEREFOR

(75) Inventor: Yong Ha Woo, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 433 days.

(21) Appl. No.: 12/422,034

(22) Filed: Apr. 10, 2009

(65) Prior Publication Data
US 2009/0276646 A1 Nov. 5, 2009

(30) Foreign Application Priority Data
May 2, 2008 (KR) .................. 10-2008-0041366

(51) Int. Cl.
G06F 1/00 (2006.01)
G06F 1/32 (2006.01)
G06F 13/42 (2006.01)
G04L 7/00 (2006.01)
(52) U.S. Cl. ........ 713/310; 713/300; 713/320; 713/323; 713/324; 713/400; 713/401
(58) Field of Classification Search .................. 713/300, 713/320, 323, 324, 400, 401, 310
See application file for complete search history.

(56) References Cited

U.S. PATENT DOCUMENTS

| | | | | |
|---|---|---|---|---|
| 5,991,287 A * | 11/1999 | Diepstraten et al. | .......... | 370/338 |
| 7,398,408 B2 * | 7/2008 | Paljug | .......................... | 713/323 |
| 7,966,503 B2 * | 6/2011 | Kimura | .......................... | 713/320 |
| 2003/0117969 A1 | 6/2003 | Koo et al. | | |
| 2004/0105421 A1 * | 6/2004 | Maki et al. | ..................... | 370/350 |
| 2004/0224728 A1 * | 11/2004 | Dacosta et al. | ............... | 455/574 |
| 2005/0047356 A1 * | 3/2005 | Fujii et al. | ...................... | 370/311 |
| 2005/0064829 A1 | 3/2005 | Kang et al. | | |
| 2005/0122926 A1 * | 6/2005 | Cromer et al. | ................ | 370/311 |
| 2007/0140199 A1 | 6/2007 | Zhao et al. | | |
| 2008/0104424 A1 * | 5/2008 | Jennings | ....................... | 713/300 |
| 2008/0219196 A1 * | 9/2008 | Ptasinski | ....................... | 370/311 |
| 2008/0279130 A1 * | 11/2008 | Lewis | ........................... | 370/311 |

FOREIGN PATENT DOCUMENTS

| EP | 1 734 698 A1 | 12/2006 |
|---|---|---|
| KR | 10-0547881 B1 | 2/2006 |
| KR | 10-0567651 B1 | 4/2006 |

* cited by examiner

Primary Examiner — Vincent Tran
(74) Attorney, Agent, or Firm — Jefferson IP Law, LLP

(57) ABSTRACT

An Apparatus, method, and system for transmitting data in a Wireless Local Access Network (WLAN) in a power management state are provided. The method includes registering a standby state entrance to an Access Point (AP), switching to an active state at a period, determining whether transmission standby data exists in the AP, transmitting, if the transmission standby data exist in the AP, a standby state entrance frame notifying the entrance to the standby state to the AP, transmitting an active request signal requesting a switching to an active state to the CPU, transmitting a signal notifying standby state release to the AP if a signal notifying switch completion to an active state is received from the CPU after the active request signal is transmitted, and receiving transmission standby data from the AP.

21 Claims, 4 Drawing Sheets

FIG. 3

| Protocol Version (2bits) | Type (2bits) | Subtype (4bits) | To DS (1bit) | From DS (1bit) | More Frag (1bit) | Retry (1bit) | Pwr Mgt (1bit) | More Data (1bit) | Protected Frame (1bit) | Order (1bit) |

METHOD AND APPARATUS FOR DATA TRANSMISSION IN WIRELESS LOCAL ACCESS NETWORK AND SYSTEM THEREFOR

PRIORITY

This application claims the benefit under 35 U.S.C §119(a) of a Korean patent application filed in the Korean Intellectual Property Office on May 2, 2008 and assigned Serial No. 10-2008-0041366, the entire disclosure of which is hereby incorporated by reference.

BACKGROUND OF THE INVENTION

1. Field of the Invention

The present invention relates to data transmission. More particularly, the present invention relates to an apparatus and method for data transmission in a power managed state, in a wireless local access network, and a system therefor.

2. Description of the Related Art

In recent years, as portable terminals have become more widely used for wireless communication, many studies have been made for improving their performance and functions. In particular, with the advance of communication technology, data, as well as a voice call, can be transmitted. In a portable terminal having a limited power capacity, a method for reducing power consumption has drawn engineers' interest due to the increased power consumption when transmitting data, i.e., a call related to packet switching.

There are a variety of technologies to reduce power consumption, used in a Wireless Local Access Network (WLAN). A Power Save (PS) mode technique, which is one of them, manages the power of a WLAN module that transmits and receives data to and from an Access Point (AP) in order to perform wireless local communication. In the PS mode, a WLAN module operates in an active state if data are received from an AP and maintains a standby state to reduce power consumption if no data are received. This mode periodically checks the AP connected with a wireless LAN module and maintains an active state or a standby state according to whether data are received.

In another conventional method for reducing power consumption in a portable terminal, a Central Processing Unit (CPU) for processing data is maintained in a standby state and is switched to an active state as occasion demands. An application example of this method is a Wake on WLAN, which is hereinafter called a WoW.

However, a portable terminal using this WoW function suffers a problem in that, since an active state and a standby state of a CPU are not inconsistent with those of a wireless LAN module that transmits/receives data to/from an AP to perform wireless local communication, it cannot process data transmitted from the AP. That is, if a CPU is in a standby state and the AP has data transmitted to a portable terminal operating in a PS mode, a wireless LAN module of the portable terminal switches a standby state of the portable terminal to an active state. After that, this state change is reported to the AP, and the AP transmits data to the portable terminal. That is, the data may be transmitted from the AP to the portable terminal before the CPU for processing data switches its standby state to an active state. In that case, the data, received by the portable terminal before the state of the CPU has been switched to an active state, are not processed by the CPU, even though the data must be processed in the CPU. Therefore, it is necessary that a portable terminal operating in a PS mode receives data after the state of the CPU is completely switched to an active state so that smooth data communication can be performed between the portable terminal and the AP.

Accordingly, there is a need for an improved apparatus and method in a WLAN for efficiently transmitting data and managing power.

SUMMARY OF THE INVENTION

An aspect of the present invention is to address at least the above-mentioned problems and/or disadvantages and to provide at least the advantages described below. Accordingly, an aspect of the present invention is to provide an apparatus and method for data transmission in a power managed state, in a wireless local access network, and a system therefor.

In accordance with an aspect of the present invention, a method for data transmission in a portable terminal connected to an Access Point (AP) in a wireless local access network is provided. The method includes registering a standby state entrance to the AP, switching to an active state at a certain period, determining whether transmission standby data exists in the AP, notifying the AP of the standby state release if the transmission standby data exist in the AP and receiving part of the transmission standby data, determining whether a CPU is in a standby state and information about data processed by the CPU is registered, determining whether the received data correspond to the CPU data if the CPU is in a standby state, transmitting, if the received data correspond to the CPU data, a frame notifying the entrance to the standby state (a standby state entrance frame) to the AP, transmitting a signal requesting switching to an active state (an active request signal) to the CPU, transmitting a signal notifying standby state release to the AP if a signal notifying switch completion to an active state is received from the CPU after the active request signal is transmitted and receiving transmission standby data from the AP.

In an exemplary implementation, the CPU data information may be registered by information provided from a CPU entering a standby state if data to be processed do not exist for a certain period of time.

In another exemplary implementation, the process of transmitting the signal requesting a switching to an active state to the CPU further includes restoring a state of an Operating System (OS) in the CPU receiving the active state switch request signal, stored when the CPU enters a standby state and receiving a switch completion signal, indicative of being switched to the active state, from the CPU, if the OS has been restored.

The method may further comprise receiving, if the received data do not correspond to the CPU data, the transmission standby data from the AP, without transmitting an active request signal to the CPU.

In accordance with another aspect of the present invention, an apparatus for data transmission in a portable terminal connected to an Access Point (AP) in a Wireless Local Access Network (WLAN) is provided. The apparatus includes a WLAN module and a CPU.

In an exemplary implementation, the wireless LAN module transmits a frame notifying of entrance to the standby state (a standby state entrance frame) to the AP, if transmission standby data existing in the AP are registered as data required to be processed by the CPU (CPU data) in a state where the CPU is in a standby state when it is connected to the AP, and then enters a standby state. The wireless LAN module transmits a frame notifying of standby state release (a standby release frame) to the AP when the CPU has switched its state to an active state and then receives the transmission standby data from the AP.

In another exemplary implementation, the CPU switches its state to a standby state if data to be processed do not exist for a period of time and transmits the CPU data information and a signal notifying of entrance to a standby state to the wireless LAN module. The CPU switches its state to an active state, if a signal requesting switching to the active state (an active request signal) is received from the wireless LAN module, and then processes the received data.

In accordance with yet another aspect of the present invention, a system for transmitting data in a Wireless Local Access Network (WLAN) is provided. The system includes an Access Point (AP) and a plurality of portable terminals.

In an exemplary implementation, the AP transmits the data to the plurality of portable terminals in the WLAN, stores data transmitted to a portable terminal in a standby state, and transmits the stored data to the portable terminal when it receives a frame notifying of standby state release (a standby state release frame) from the portable terminal.

In an exemplary implementation, the portable terminal may be connected to the AP. If the portable terminal is in a standby state and transmission standby data in the AP correspond to data to be processed by a CPU in a standby state, it transmits a frame notifying of entrance to the standby state (a standby state entrance frame) to the AP. If the CPU switches its state to an active state, the portable terminal transmits the standby state release frame to the AP and then receives transmission standby data from the AP while the portable terminal is in the standby state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description in conjunction with the accompanying drawings, in which:

FIG. 3 is a view illustrating a structure of a frame control field according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
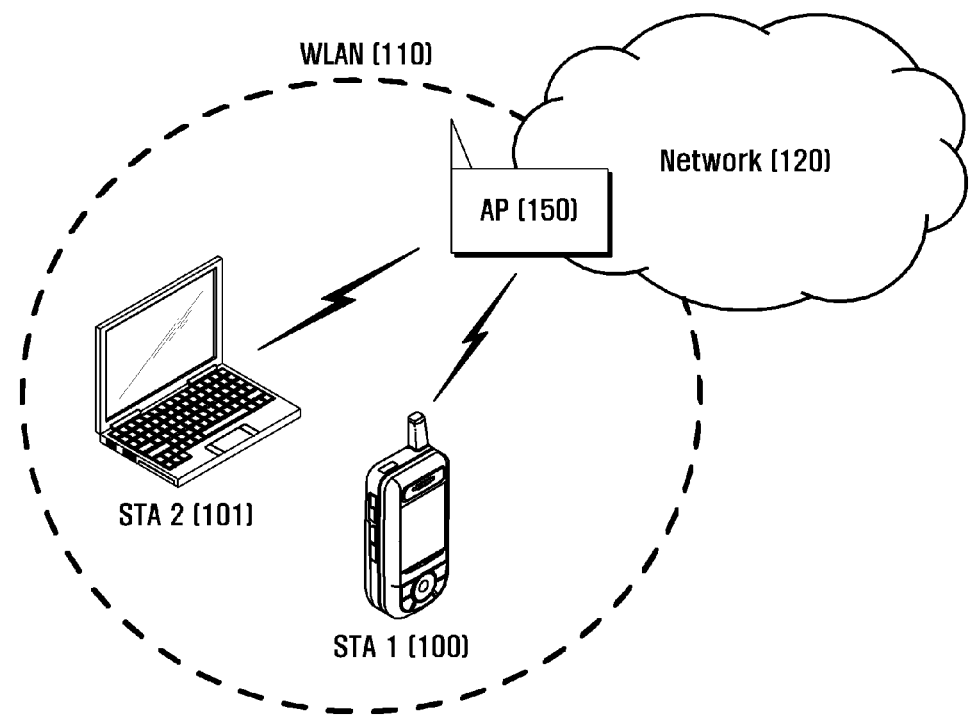
FIG. 1 is a view illustrating a wireless local access network according to an exemplary embodiment of the present invention.

FIG. 1 is a view illustrating a wireless local access network according to an exemplary embodiment of the present invention.

Referring to FIG. 1, the Wireless Local Access Network (WLAN) 110 is formed through a plurality of portable terminals, such as a station 1STA 1 100 and a station 2 STA 2 101. These portable terminals are connected to other devices (not shown) on a network 120 through an Access Point (AP) 150 connected to the network 120. The network 120 may be any of various communication networks, such as other WLANs, the Internet, etc., which are connected to the WLAN 110 through the AP 150. In addition to STA 1 100 or STA 2 101, the portable terminals may be any device that includes a wireless LAN module and can perform wireless local communication, for example, a Personal Digital Assistance (PDA), a laptop, a communication terminal, etc.

Figure 2:
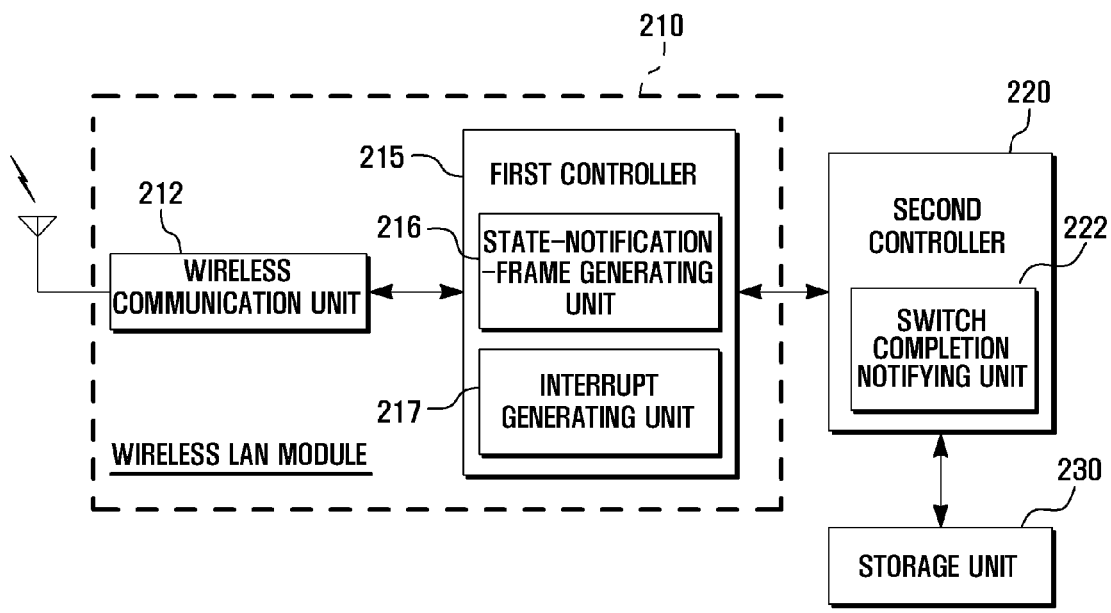
FIG. 2 is a schematic block diagram illustrating a portable terminal according to an exemplary embodiment of the present invention.

FIG. 2 is a schematic block diagram illustrating a portable terminal according to an exemplary embodiment of the present invention. In the illustrated example, the portable terminal is referred to as STA 1 100. However, this is merely for convenience and it is to be understood that the portable terminal may include STA 1 100, STA 2 101 or any other portable terminal as described above. Although FIG. 2 shows only elements of the STA 1 100 to perform wireless local communication, it should be understood that the STA 1 100 may also include elements to perform other functions other than the wireless local communication.

Referring to FIG. 2, the portable terminal STA 1 100 includes a wireless LAN module 210, a second controller 220, and a storage unit 230.

The wireless LAN module 210 serves to perform wireless local communication and includes a wireless communication unit 212 and a first controller 215. The wireless communication unit 212 is configured to include a frequency transmitter for up-converting the frequency of transmitted signals for wireless LAN communication and amplifying the transmitted signals. The wireless communication unit 212 also includes a frequency receiver for low-noise amplifying of received RF signals and down-converting the frequency of the received RF signals. The first controller 215 is a processor that controls the operation of the wireless LAN module 212. In particular, the first controller 215 includes a state-notification-frame generating unit 216 and an interrupt generating unit 217. The state-notification-frame generating unit 216 generates a standby state entrance frame, which notifies that the portable terminal STA 1 100 enters a standby state, or generates a standby state release frame, which notifies that the portable terminal STA 1 100 has woken up from a standby state and is in an active state. The generated frame is a signal to report the state of the portable terminal, and may be implemented with any type of format set between the portable terminal 100 and the AP 150 shown in FIG. 1. In an exemplary embodiment of the present invention, the format of the frame may be implemented with a Media Access Control (MAC) defined in the Institute of Electrical and Electronics Engineers (IEEE) 802.11 standard, related to wireless local communication technology. In particular, in an exemplary embodiment of the present invention, the state of the portable terminal may be reported through a power management field, having a size of 1 bit from among the frame control field of 16 bits in the MAC frame. Furthermore, the MAC frame may be a beacon frame.

FIG. 3 is a view illustrating a structure of a frame control field according to an exemplary embodiment of the present invention.

Referring to FIG. 3, the frame control field of 16 bits is configured to include the following sub-fields: 1) a protocol version field (Protocol Version) of 2 bits that includes protocol version information, 2) type field (Type) of 2 bits and 3) sub-type field (Subtype) of 4 bits, which identify a frame function, 4) a 'To' distribution system (To DS) of 1 bit and 5) a From Distribution System (From DS) of 1 bit, which include data transmission path information, 6) a More Fragment field (More Frag) of 1 bit that includes information about subsequent data, 7) a retry field (Retry) of 1 bit that includes information as to whether a frame is retransmitted, 8) a Power Management field (Pwr Mgt) of 1 bit that includes a power management mode, 9) a More Data field (More Data) of 1 bit that includes whether there are data to be transmitted to a terminal in a PS mode, 10) a Protected Frame field (Protected Frame) of 1 bit that includes information as to whether the body portion in the frame is encoded and 11) an Order field (Order) of 1 bit that includes information as to whether there are data for Quality of Service (QoS).

In an exemplary embodiment of the present invention, the Power Management field (Pwr Mgt) of 1 bit is used in order to show that a portable terminal 100, i.e., a wireless LAN module 210, is in a standby state or an active state. When the power management field is set to '1', it indicates that the wireless LAN module 210 enters a standby mode. On the other hand, when the power management field is set to '0', it indicates that the wireless LAN module 210 is switched to an active state and in a state where it can receive data from the AP 150. This operation will be described in more detail later.

If the data received from the AP 150 correspond to data that was registered in such a way to be processed by a CPU, i.e., the second controller 220, the interrupt generating unit 217 generates an interrupt signal and transmits it to the second controller 220, so that the second controller 220 wakes up.

Referring again to FIG. 2, the second controller 220 controls the operation of the portable terminal 100 and may include a switch completion notifying unit 222. In an exemplary embodiment of the present invention, the second controller 220 may be implemented with a CPU. If data to be processed in the second controller 220 do not exist for a certain period of time, the second controller 220 notifies the wireless LAN module 210 that it may enter a standby state (or a sleep mode). When notifying of the entrance of the standby state, the second controller 220 transmits information about data processed thereby to the wireless LAN module 210. Only when the second controller 220, switched to a standby state, receives data to be processed thereby from the AP 150, the second controller 220 provides the wireless LAN module 210 with data information, which is received from the AP 150 and must be processed by the second controller 220. That is, the data information requires that the second controller 220 is switched to an active state. The wireless LAN module 210 may store the received data information in a storage unit (not shown). When data corresponding to the received data information has been received from the AP 150, and when the second controller 220 receives an interrupt signal for receiving data from the wireless LAN module 210, it switches its standby state to an active state. After completing the switching to the active state, the second controller 220 notifies the AP 150 of the standby state release through the wireless LAN module 210. When the active state has been switched to the standby state, the second controller 220 stores the operating system state at the state switching completion time point in the storage unit 230. After that, if the standby state is switched to the active state, the second controller 220 reads out the stored state of the operating system and restores the state of the operating system. After the stored state of the operating system has been completely restored, the switch-completion notifying unit 222 transmits a signal, which notifies that the second controller 220 has completely switched its state to an active state, to the wireless LAN module 210, i.e., the first controller 215.

The storage unit 230 stores an application program for operating the portable terminal and stores data generated as the application program is executed. In particular, when the second controller 220, i.e., a CPU, switches its active state to a standby state, the storage unit 230, according to an exemplary embodiment of the present invention, stores the state of the operating system. After that, when the second controller 220 switches its standby state to the active state, the storage unit 230 provides the second controller 220 with the stored state of the OS.

Figure 4:
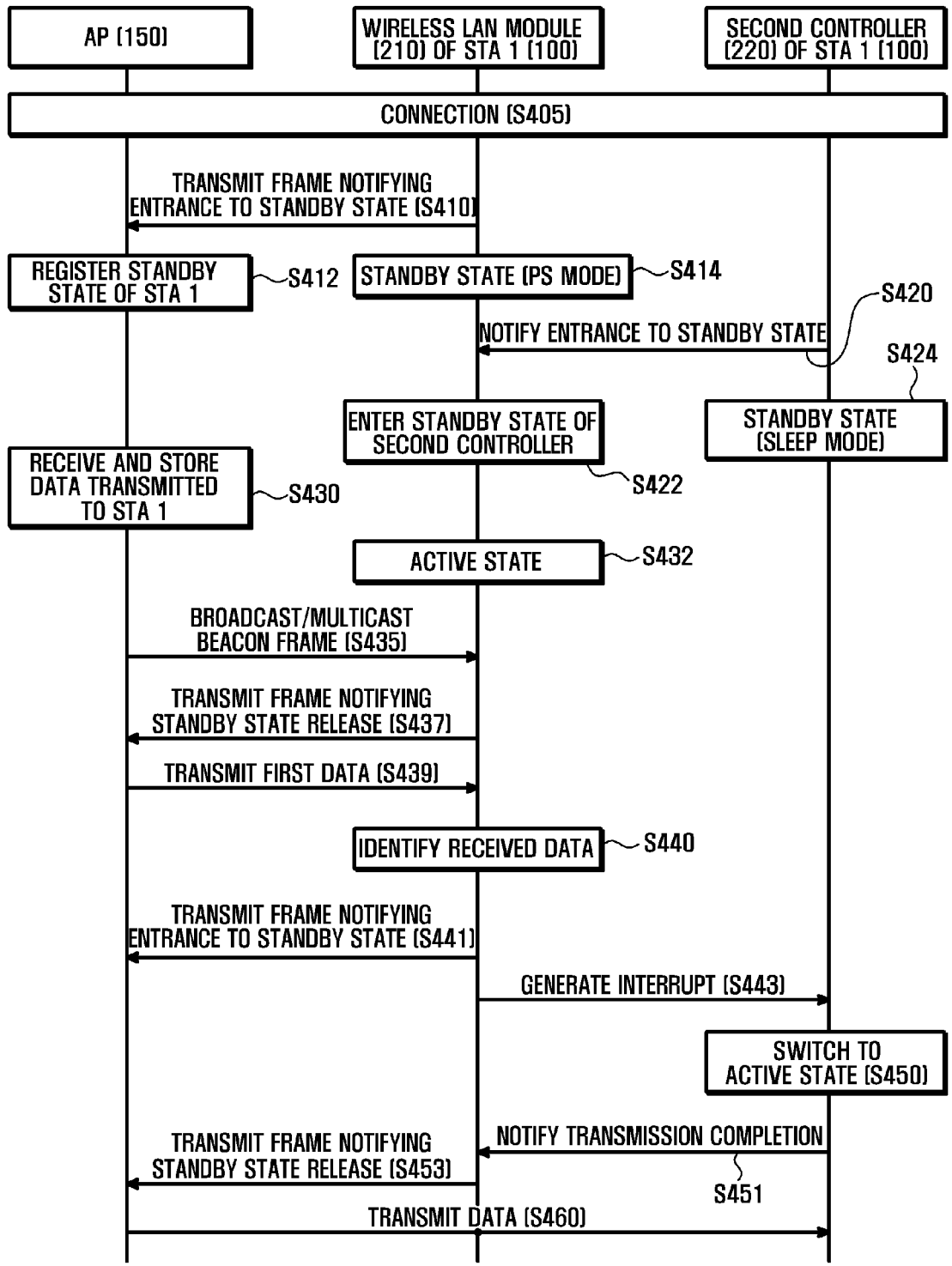
FIG. 4 illustrates a signal procedure in which data are transmitted in a wireless LAN system in a power management mode, according to an exemplary embodiment of the present invention.

FIG. 4 illustrates a signal procedure in which data are transmitted in a wireless LAN system in a power management mode, according to an exemplary embodiment of the present invention. The power management mode generally refers to a mode in which power consumption is reduced by switching between an active state and a standby state as occasion demands. In an exemplary embodiment of the present invention, a standby state indicates a state in which the wireless LAN module 210 of FIG. 2 enters a PS mode to reduce power consumption or a state in which the second controller 220, used as a CPU, enters a sleep mode and enters a suspended state. An active state of the wireless LAN module 210 indicates a state in which the wireless LAN module 210 wakes up from a PS mode and then operates. An active state of a CPU indicates a state in which the second controller 220, used as a CPU, wakes up from a sleep mode and then restores the state of the OS.

Referring to FIG. 4, the wireless LAN module 210 is connected to the AP 150 by the control of the second controller 220 shown in FIG. 2 in step S405. The wireless LAN module 210 of the portable terminal STA 1 100 may perform connection with the AP 150 according to a power supply status of the portable terminal STA 1 100, a power supply status of the wireless LAN module 210, a user request, etc. When the wireless LAN module 210 is connected to the AP 150, it generates a frame notifying that the wireless LAN module 210 enters a standby state (PS mode) and then transmits it to the AP in step S410. The frame, which notifies of the entrance to the standby state, may have a structure as shown in FIG. 3. As described above with reference to FIG. 3, the power management field may be set to '1' and the other remaining fields may be set to 'Null'. When receiving the frame, the AP 150 registers and stores information about a standby state of the portable terminal STA 1 100 in a previously set list in step S412. After notifying the AP 150 of the entrance to a standby state, the wireless LAN module 210 of the portable terminal STA 1 100 enters a standby state in step S414.

If the second controller 220 of the portable terminal STA 1 100 does not have data to be processed for a certain period of time, it notifies the wireless LAN module 210 of the entrance to a standby state in order to enter a sleep mode in step S420. The second controller 220 also provides the wireless LAN module 210 with data information that it intends to process. When the wireless LAN module 210 receives the data information from the second controller 220, it registers the standby state of the second controller 220 and the data information therein in step S422. After the second controller 220 notifies the wireless LAN module 210 of the entrance to the standby state, it enters a standby state (a sleep mode) in step S424. The second controller 220 may provide the wireless LAN module 210 with data information that is a type of specialized packet.

There may be a variety of methods for registering the specialized packet in the wireless LAN module 210. Examples of the method include registering information based on protocol types, based on sources, or based on destinations. The method for registering information based on protocol types is performed in such a way that the second controller 220 is woken up if packets are received by a particular protocol, such as a ping packet (ICMP), ARP, etc. The method for registering information based on sources is performed in such a way as to register information about a particular source and to wake up the second controller 220 using data from the registered source. The method for registering information based on destinations is performed in such a way as to register information about a particular destination and to wake up the second controller 220 using data for the registered destination. It should be understood that information about data that must be processed by the second controller 220 may be registered by the other methods besides the described methods.

If the AP 150 receives data, transmitted to the portable terminal STA 1 100, from the network 120 in step S430, it does not directly transmit the received data to the portable terminal STA 1 100 but instead stores the data therein because it has been registered that the portable terminal STA 1 100 is in a standby state. The AP 150 stores data therein until it receives a standby state release, i.e., a frame, from the portable terminal STA 1 100, where the frame notifies that the portable terminal STA 1 100 switches from its standby state to an active state. The AP 150 periodically broadcasts or multicasts information notifying that such data exists, in which the information is included in an MAC frame. The portable terminal STA 1 100 receives a broadcast or multicast MAC frame, for example, a beacon frame, in order to determine whether there are transmission standby data to be transmitted to itself. In order to receive a beacon frame, the wireless LAN module 210 is periodically woken up from a standby state and then transitioned to an active state. To this end, the wireless LAN module 210 switches a standby state to an active state in step S432. The AP 150 broadcasts or multicasts a beacon frame in step S435. After the wireless LAN module 210 receives the beacon frame and ascertains that the AP 150 has data transmitted to the wireless LAN module 210, it generates a frame notifying of a standby state release and transmits the frame to the AP 150, in order to receive the data from the AP 150 in step S437. After the AP 150 has received the frame notifying of the standby state release of the portable terminal STA 1 100, it transmits the first data to the portable terminal STA 1 100, i.e., the wireless LAN module 210, in step S439. The first data refer to data that include a certain amount of data that can be transmitted once and first transmitted from among the total data that are divided into the amount of data. The data may be divided into a frame unit.

The wireless LAN module 210 evaluates the received first data in step S440. Evaluating data is to determine whether the received data correspond to data information registered at step S422. If the received data corresponds to the registered data information, the wireless LAN module 210 transmits a frame, which notifies the entrance to a standby state, to the AP 150 in order to stop receiving data in step S441. The frame is substantially the same as the frame transmitted at step S410. The frame may be set in such way that its power management field is '1' and the other remaining fields are 'Null'. In that case, before the second controller 220 switches a standby state to an active state, it can prevent data from being received from the AP 150. The wireless LAN module 210 generates an interrupt signal and transmits it to the second controller 220 to wake up the second controller 220 in step S443.

The second controller 220 switches its state to an active state and restores the state of the OS stored in the storage unit 230 illustrated in FIG. 2 in step S450. After the second controller 220 has restored the OS state and switched to an active state at step S450, the second controller 220 transmits a signal, which notifies a switch completion to an active state, to the wireless LAN module 210 in step S451. The wireless LAN module 210 transmits a frame, which notifies a standby state release, i.e., a switch to an active state, to the AP 150 in step S453. The AP 150, receiving the standby state release, transmits stored data to the second controller 220 through the portable terminal STA 1 100, i.e., the wireless LAN module 210, in step S460.

Figure 5:
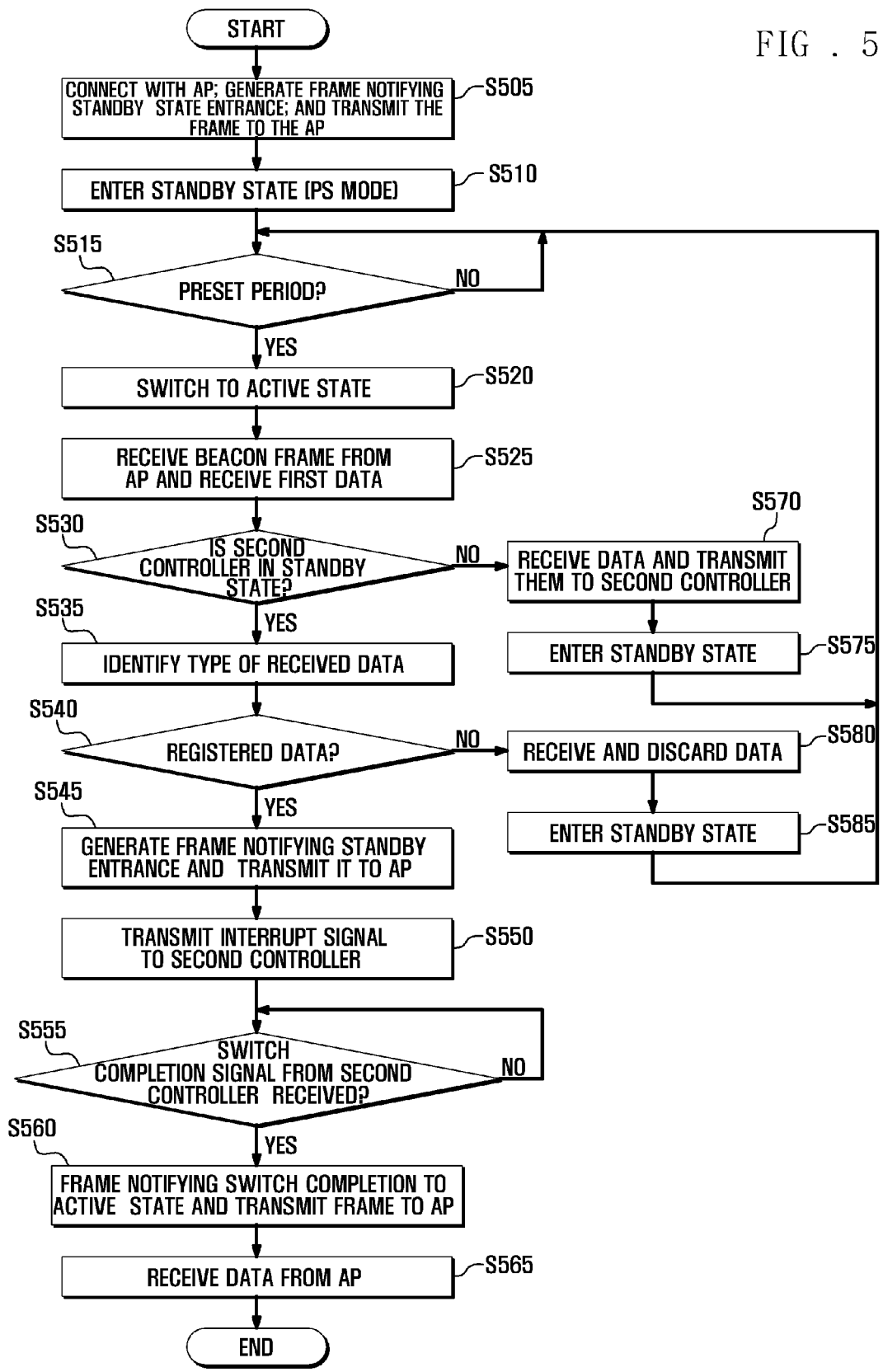
FIG. 5 is a flowchart describing a method for transmitting data in a wireless LAN module, according to an exemplary embodiment of the present invention.

FIG. 5 is a flowchart describing a method for transmitting data in a wireless LAN module, according to an exemplary embodiment of the present invention.

Referring to FIG. 5, the first controller 215, an example of which is illustrated in FIG. 2, attempts to connect with the AP 150 shown in FIG. 1 and, if the first controller 215 is connected to the AP 150, the state-notification-frame generating unit 216 of the first controller 215 generates a frame notifying the entrance to a standby state and then transmits it to the AP 150 in step S505. The generated frame may have a structure as illustrated in FIG. 3 and may be set in such a way that the power management field is '1' and the other remaining fields are 'Null'. After notifying the AP 150 that the portable terminal STA 1 100 enters a standby state, the first controller 215 enters a standby state, i.e., a PS mode in step S510.

The AP 150 broadcasts or multicasts a beacon frame in a corresponding WLAN 110 at a certain period (a beacon interval). This broadcast or multicast beacon frame includes information as to whether there are data to be transmitted to a portable terminal registered in the list of portable terminals in a standby state. The portable terminal periodically receives a beacon frame from the AP 150 in an active state in order to determine whether the AP 150 has data to be transmitted to the portable terminal. That is, the first controller 215 determines whether a certain period elapses in step S515. If it is determined that the period has elapsed at step S515, the first controller 215 switches its state to an active state in step S520. If it is determined that the period has not elapsed at step S515, the first controller 215 maintains a standby state until the period has elapsed. The period may be determined when it is designed or manufactured. For example, in an exemplary embodiment of the present invention, it is assumed that the period is a transmission period of a Delivery Traffic Indication Map (DTIM) defined in IEEE 802.11. The first controller 215 receives a beacon frame from the AP 150, evaluates information included in the beacon frame, ascertains that transmission standby data exist in the AP 150, and receives the first data from the AP 150 in step S525. In order to receive the first data, the first controller 215, i.e., the state-notification-frame generating unit 216, generates a frame notifying of a standby state release and transmits it to the AP 150. The frame may be configured to have a structure as illustrated in FIG. 3, where the power manage field is set to '0' and the other remaining fields are set to 'Null'. It should be understood that the frame may be implemented with a Power Save Poll (PS-Poll) frame whose structure is different from the frame structure as illustrated in FIG. 3. The PS-Poll frame refers to a frame, as a response, requesting data from AP 150. Since the AP 150 receiving the standby state release frame transmits transmission standby data, the first controller 215 receives the first data. The first data can be defined as, when the total data to be transmitted are divided into a plurality of data based on a certain amount of data be transmitted once, the data to be first transmitted is called the first data. It is determined whether the first data are registered in data information processed by the second controller 220.

The first controller 215 determines whether the second controller 220 is in a standby state in step S530. If a data processing operation is not performed for a certain period of time, regardless of the operation of the wireless LAN module 210, the second controller 220 enters a standby state and provides the first controller 215 of the wireless LAN module 210 with data information requesting that the second controller 220 is switched to an active state. Through the data information and information stored in a memory (not shown) of the wireless LAN module 210 for the standby state of the second controller 220, the first controller 215 can determine whether the second controller 220 is in a standby state. The first controller 215 evaluates the data transmitted from the AP 150 in step S535. If the first controller 215 ascertains that the received data correspond to data information in step S540, it proceeds to step S545. On the contrary, if the first controller 215 ascertains that the received data do not correspond to data information at step S540, it proceeds to step S580.

If the received data correspond to registered data information at step S540, the first controller 215, i.e., the state-notification-frame generating unit 216, generates a frame notifying the entrance to a standby state and then transmits it to the AP 150, so as to no longer receive data, in step S545. The transmitted frame notifying the entrance to the standby state is substantially the same frame transmitted at step S505. The frame may be set in such a way that its power management field is set to '1' and the other remaining fields are set to 'Null'.

The first controller 215, i.e., the interrupt generating unit 217, generates an interrupt signal to wake up the second controller 220 and transmits it to the second controller 220 in step S550. The second controller 220 receiving the interrupt signal switches its state to an active state and restores the OS state stored in the storage unit 230. After the OS state has been restored, the second controller 220, i.e. the switch completion notifying unit 222, generates a signal notifying of a switch completion to an active state and transmits it to the first controller 215. The first controller 215 determines whether to receive the switch completion signal from the second controller 220 in step S555. If the first controller 215 ascertains that the switch completion signal has been transmitted from the second controller 220 at S555, it proceeds to step S560, however, if not, it waits until the switch completion signal is received. The first controller 215, i.e., the state-notification-frame generating unit 216, generates a frame notifying a standby state release, i.e., a frame notifying a switch to an active state, and transmits it to the AP 150 in step S560. The generated frame may have a structure as describe in FIG. 3, where the power management field is set to '0' and the other remaining fields are set to 'Null'. The frame notifying of a standby state release may be a PS-Poll frame. Since the AP 150 receiving the standby state release information of the portable terminal STA 1 100 transmits stored data to the portable terminal STA 1 100, the first controller 215 receives data from the AP 150 in step S565. The first controller 215 receives transmission standby data to be transmitted to the AP 150 according to a method for receiving all data stored in the AP 150, continuing to maintain an active state, or according to a method for transmitting a PS-Poll frame to the AP 150 and receiving data in response to a reply of the PS-Poll frame transmission. Therefore, an exemplary method and apparatus of the present invention can be operated in such a way that, if there are data to be processed by a CPU in a standby state, the CPU can completely switch its standby state to an active state and then receive the data from the AP. However, the conventional method has problems in that, before the CPU switches its state to an active state, it receives data from the AP and thus cannot process them completely.

Referring again to step S530, if the first controller 215 determines that the second controller 220 is in a standby state, the first controller 215 receives data from the AP 150 and transmits them to the second controller 220 in an active state in step S570. The first controller 215 receives transmission standby data to be transmitted to the AP 150 according to a method for receiving all data stored in the AP 150, continuing to maintain an active state, or according to a method for transmitting a PS-Poll frame to the AP 150 and receiving data in response to a reply of the PS-Poll frame transmission. After receiving all transmission standby data to be transmitted to the AP 150, the first controller 215 re-enters a standby state in step S575. The process to enter a standby state is the same as that described above.

Referring again to step S540, if the received data do not correspond to registered data requesting that the second controller 220 switches its state to an active state, the first controller 215 does not wake up the second controller 220 but receives data from the AP 150 in step S580. However, since the second controller 220 is in a standby state, the received data are discarded. When receiving all transmission standby data to be transmitted to the AP 150, the first controller 215 re-enters a standby state in step S585. The process to enter a standby state is the same as that described above.

As described above, exemplary embodiments of the present invention may resolve the conventional problems in which a portable terminal, whose wireless LAN module can be operated in a power save mode and whose CPU has a WoW, receives data from the AP in a state where the CPU does not completely switch its standby state to an active state, so that data intended to be processed by the CPU cannot be completely processed.

Exemplary embodiments of the present invention have advantages in that, since the portable terminal receives data after the OS state stored to enter a standby state has been completely restored in the CPU, it can be synchronous with the AP for data transmission. That is, exemplary embodiments of the present invention may resolve the problem in which the portable terminal must store data received from the AP because the portable terminal is not synchronous with the AP during the data transmission.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims and their equivalents.

What is claimed is:

1. A method for data transmission and reception in a portable terminal connected to an Access Point (AP) in a Wireless Local Access Network (WLAN), the method comprising:
   transmitting, if transmission standby data exist in the AP in a state where a Central Processing Unit (CPU) is in a standby state, a standby state entrance frame notifying of entrance to the standby state to the AP;
   switching the state of the CPU to an active state;
   transmitting a frame notifying of standby state release to the AP;
   receiving the transmission standby data from the AP;
   receiving part of the transmission standby data from the AP before the standby state entrance frame is transmitted to the AP; and
   evaluating information about the received part of the transmission standby data from the AP required to be processed in the CPU.

2. The method of claim 1, wherein the switching of the state of the CPU to the active state comprises:
   transmitting an active request signal requesting a switch to an active state to the CPU when the standby state entrance frame is transmitted;
   restoring, if the CPU receives the active request signal, a state of an Operating System (OS), stored when the CPU enters a standby state; and
   transmitting a switch completion signal, indicative of being switched to the active state, if the state of the OS is stored in the CPU.

3. The method of claim 1, wherein the evaluating of information about the received part of the transmission data from the AP comprises:
   determining whether the received part of the transmission data from the AP corresponds to CPU data received from the CPU.

4. The method of claim 3, further comprising:
   transmitting, if the received data correspond to the CPU data, the standby state entrance frame to the AP.

5. The method of claim 1, wherein:
   the standby state entrance frame comprises a Media Access Control (MAC) frame; and
   the frame notifying standby state release comprises at least one of a MAC frame and a Power Save Poll (PS-Poll) frame.

6. The method of claim 1, wherein the transmitting of the frame notifying of entrance to the standby state comprises:
   switching the standby state to an active state at at least one of a beacon interval and a transmission period of a Delivery Traffic Indication Map (DTIM); and
   determining whether transmission standby data exist in the AP.

7. The method of claim 3, wherein the information about CPU data comprises at least one of data information based on protocol types, data information based on sources, and data information based on destinations.

8. The method of claim 3, further comprising:
   receiving, if the received data do not correspond to the CPU data, the transmission standby data from the AP, without transmitting an active request signal to the CPU.

9. An apparatus for data transmission and reception in a portable terminal connected to an Access Point (AP) in a Wireless Local Access Network (WLAN), the apparatus comprising:
   a WLAN module for transmitting, if transmission standby data exist in the AP in a state where a Central Processing Unit (CPU) is in a standby state, a frame notifying of entrance to the standby state to the AP, and for transmitting a signal requesting a switch to an active state to the CPU; and
   the CPU for processing data in an active state, for switching to one of a standby state and an active state according to whether there are data to be processed for a period of time, and for transmitting a signal notifying a state switch to the wireless LAN module.

10. The apparatus of claim 9, wherein the WLAN module receives the transmission standby data from the AP, after a frame notifying standby state release has been transmitted to the AP, when the CPU has switched its state to an active state.

11. The apparatus of claim 9, wherein the CPU transmits information about CPU data required to be processed by the CPU to the wireless LAN module when it transmits the signal notifying of a standby state entrance to the wireless LAN module.

12. The apparatus of claim 11, wherein the WLAN module transmits the standby state entrance frame to the AP if transmission standby data in the AP correspond to the CPU data.

13. The apparatus of claim 12, wherein the CPU data comprises at least one of data information based on protocol types, data information based on sources, and data information based on destinations.

14. The apparatus of claim 9, wherein the wireless LAN module switches its state to an active state at a period and then determines whether transmission standby data exist in the AP.

15. The apparatus of claim 11, wherein the WLAN module receives part of the transmission standby data if the transmission standby data exist and determines whether the received data correspond to the CPU data.

16. The apparatus of claim 15, wherein the WLAN module further transmits the active request signal to the CPU if the received data correspond to the CPU data.

17. The apparatus of claim 9, wherein the CPU restores a state of an Operating System (OS), stored when it enters a standby state, if it receives a signal requesting a switch to the active state, and transmits the active switch completion signal to the WLAN module if the OS state has been restored.

18. The apparatus of claim 14, wherein the period includes at least one of a beacon interval and a transmission period of a delivery traffic indication map (DTIM).

19. The apparatus of claim 9, further comprising:
   a storage unit for storing the state of the OS of the CPU when entering a standby state.

20. A system for transmitting data in a Wireless Local Access Network (WLAN), comprising:
   an Access Point (AP); and
   a plurality of portable terminals,
   wherein the AP transmits data to the plurality of portable terminals in the WLAN, stores data for a portable terminal in a standby state, and transmits data to the portable terminal when the portable terminal releases its standby state and the portable terminal is connected to the AP, determines whether transmission standby data exist in the AP while a Central Processing Unit (CPU) is in a standby state, and transmits a frame notifying of entrance to a standby state to the AP if the data exist, wherein the plurality of portable terminals receives a part of the transmission standby data from the AP before the frame notifying of entrance to the standby state is transmitted to the AP, and wherein the plurality of portable terminals evaluates the received part of the transmission standby data from the AP.

21. The system of claim 20, wherein the portable terminal transmits a frame notifying of standby state release to the AP if the CPU switches a standby state to an active state and receives the transmission standby data from the AP.

* * * * *